(12) United States Patent
Delacey et al.

(10) Patent No.: US 8,619,957 B2
(45) Date of Patent: Dec. 31, 2013

(54) DELIVERY OF CALL DATA IN A COMMUNICATION SYSTEM

(75) Inventors: Charles F. Delacey, Peyton, CO (US); David E. Phelps, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1654 days.

(21) Appl. No.: 12/106,549

(22) Filed: Apr. 21, 2008

(65) Prior Publication Data

US 2009/0262917 A1 Oct. 22, 2009

(51) Int. Cl.
*H04M 1/56* (2006.01)
*H04M 15/06* (2006.01)
*H04M 3/42* (2006.01)
*H04M 7/00* (2006.01)
*H04L 12/66* (2006.01)

(52) U.S. Cl.
USPC ............ 379/142.04; 379/211.02; 379/212.01; 379/221.01; 370/352

(58) Field of Classification Search
USPC ............. 379/142.04, 211.02, 212.01, 221.01; 370/352–356
See application file for complete search history.

(56) References Cited

U.S. PATENT DOCUMENTS

| | | | |
|---|---|---|---|
| 6,798,766 B1 * | 9/2004 | Bevan et al. | 370/352 |
| 6,970,551 B2 * | 11/2005 | Costrell et al. | 379/234 |
| 7,894,587 B1 * | 2/2011 | Laurinavichus | 379/207.14 |
| 2003/0026413 A1 * | 2/2003 | Brandt et al. | 379/230 |

* cited by examiner

*Primary Examiner* — Ahmad Matar
*Assistant Examiner* — Nafiz E Hoque

(57) ABSTRACT

A method may include receiving a call having call data, determining that the call data cannot be forwarded along a call path, assigning an identifier to the call data, forwarding the call along the call path without the call data, and storing the call data and the identifier at a device outside the call path.

22 Claims, 9 Drawing Sheets

DELIVERY OF CALL DATA IN A COMMUNICATION SYSTEM

BACKGROUND

A network may have the ability to generate, retrieve, and/or deliver call data during the course of a call, such as a telephone call, from one device to another device. For example, a caller may respond to a voice menu system and generate call data. The call data and the call may be forwarded along a call path to reach a particular destination. In some cases, however, the ability to handle the call data may not be fully supported throughout the network. For example, the network may include one or more devices, interfaces, etc., in the call path, that are incapable of transmitting and/or receiving the call data. In such an instance, the call data may be lost or discarded and/or the call data may not reach the particular destination.

DETAILED DESCRIPTION OF PREFERRED EMBODIMENTS

Figure 1:
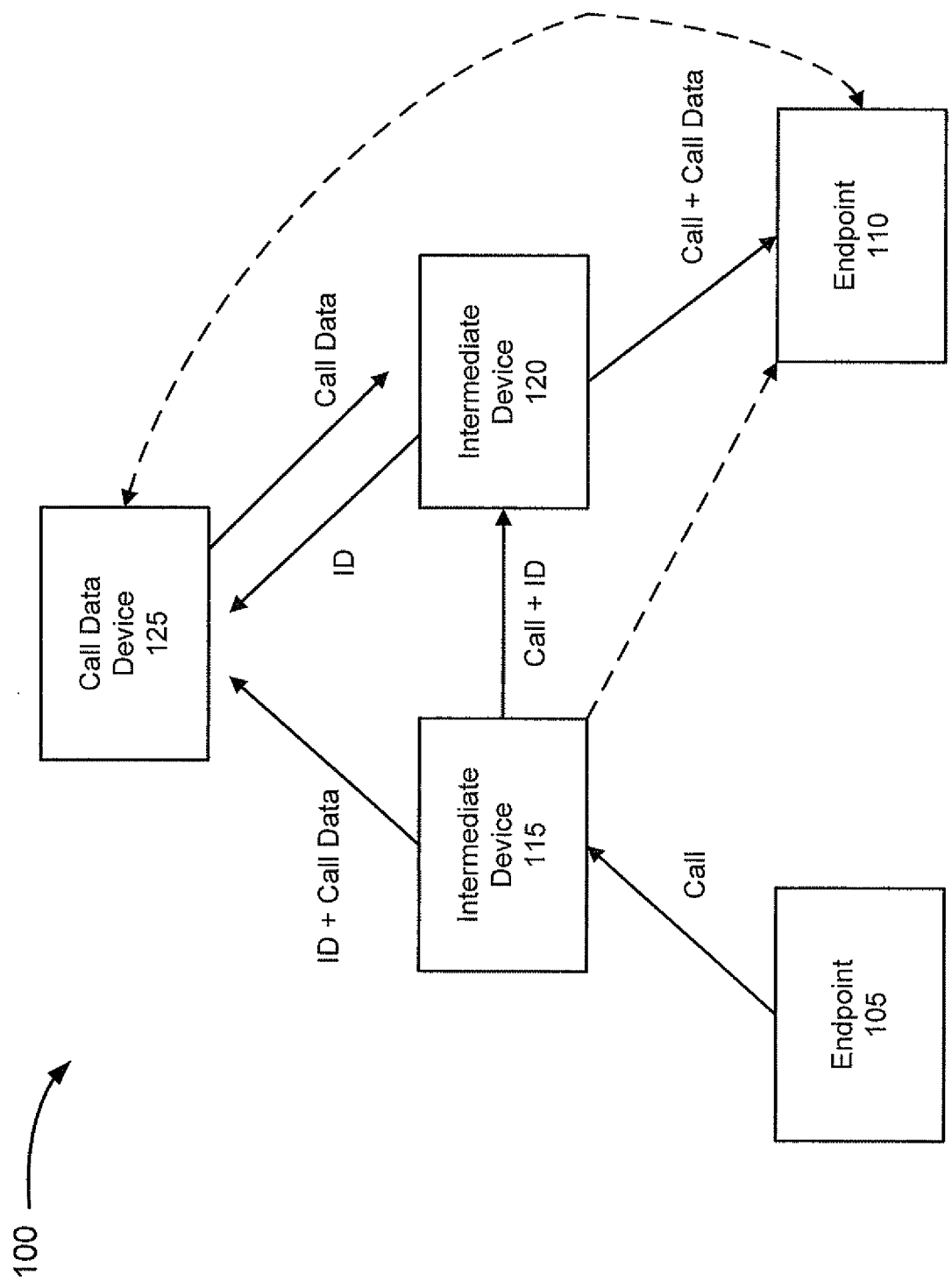
FIG. 1 is a diagram illustrating concepts described herein.

The following detailed description refers to the accompanying drawings. The same reference numbers in different drawings may identify the same or similar elements. Also, the following description does not limit the invention.

The term "may" is used throughout this application and is intended to be interpreted, for example, as "having the potential to," "configured to," or "being able to", and not in a mandatory sense (e.g., as "must"). The term "component," is intended to be broadly interpreted to include hardware or a combination of hardware and software. The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

The phrase "call data," as used herein, is intended to be broadly interpreted to include any type of data. For example, the call data may correspond to user-to-user information (UUI). UUI is described in the Q.931 standard. As specified in the Q.931 standard, a UU information element may transport UUI and the UUI may include any type of data.

In other instances, the call data may not correspond to UUI. Rather, the call data may be transmitted and/or received by intermediate devices within a call path and not destined for an endpoint (e.g., a user device). For example, call data may be used for routing decisions between/among intermediate devices. As an example, an Interactive Voice Recognition (IVR) system may be used in conjunction with a conferencing system. In such an instance, a call may be sent to the IVR system for obtaining a user Personal Identification Number (PIN). When the user PIN is obtained, the call may be transferred to the conferencing system, which may utilize the dialed number and the user PIN to forward the call to the appropriate conference bridge. In this regard, call data may include data that is normally not permitted within normal call signaling (e.g., the automatic number identification (ANI) and the dialed number identification service (DNIS)). As another example, call data may be exchanged between/among intermediate devices in the case of spanning networks (e.g., a time division multiplexing (TDM) network and an Internet Protocol (IP) network). For example, sometimes not all of the Signaling System 7 (SS7) parameters on the TDM side translate to IP headers on the IP side, and/or vice versa. As a result, the data may be lost when a call traverses from the TDM network to the IP network, and/or vice versa. In such instances, call data may include this type of data (e.g., SS7 parameter information). For example, the SS7 parameter information may include information digits that identify calls from pay phones, prisons, hotels, etc.

Additionally, or alternatively, the call data may be generated by one or more devices in the call path. Additionally, or alternatively, the call data may be generated during any phase or stage of the call (e.g., call setup, call disconnect, call connection, etc.). Additionally, or alternatively, the call data may not necessarily be generated during the course of the call. For example, the call data may include call data that was previously stored on a device in the call path and/or on a device outside the call path.

The term "call," as used herein, is intended to be broadly interpreted to include any type of communication. For example, a call may include a telephone call, an Instant Message (IM), a multimedia communication (e.g., an audio/video conference), etc.

The term "call path," as used herein, is intended to include a next hop of a route toward a particular destination or the particular destination itself. As to be described in greater detail below, call data may be transmitted to a device considered "outside the call path." In this regard, outside the call path is intended to mean a route that, but for the presence of call data, would not otherwise be utilized by a device in the call path.

Although an Integrated Services Digital Network (ISDN) may be discussed in reference to implementations associated with the concepts described herein, these concepts are not dependent on employing a particular type of network. Rather, these concepts may be adapted to other types of networks not specifically described herein. Further, although a particular call scenario may be described in reference to an implementation associated with the concepts described herein, these concepts are not dependent on the particular call scenario but may be adapted with other types of call scenarios.

The concepts described herein may provide for delivering call data when a device in a call path is incapable of handling (e.g., receiving, transmitting, processing, etc.) the call data. For example, a device interface may not provide for a call data parameter. In such an instance, the device may be incapable of transmitting, receiving, and/or processing, etc., the call data to/from another device in the call path. FIG. 1 is a diagram illustrating an exemplary environment 100 in which the concepts may be implemented. As illustrated, environment 100 may include endpoints 105 and 110, intermediate devices 115 and 120, and call data device 125.

Endpoints 105 and 110 may include a device having communication capability. For example, endpoints 105 and 110 may include, respectively, a telephone, a computer, a personal digital assistant (PDA), and/or some other type of user device.

Intermediate devices 115 and 120 may include a device having communication capability. For example, intermediate devices 115 and 120 may include a router, a gateway, a bridge, and/or some other type of network device. Call data device 125 may include a device having communication capability. For example, call data device may include a server device.

For purposes of discussion, assume a user of endpoint 105 places a call to endpoint 110. The call is received by intermediate device 115. The call may include call data. Intermediate device 115 may determine that it is unable to forward the call data to intermediate device 120 along a call path. For example, assume that the interface of intermediate device 115 is incapable of handling the call data. Intermediate device 115 may assign an identifier to the call data. The identifier may include, for example, a character string (e.g., a number, alphanumeric string, etc.). In this instance, intermediate device 115 may transmit the call data and the identifier to call data device 125. Call data device 125 may store the call data and the identifier. Additionally, intermediate device 115 may transmit the call and the identifier to intermediate device 120.

Intermediate device 120 may receive the call and the identifier from intermediate device 115. Also, intermediate device 120 may receive the call data from call data device 125. For example, intermediate device 120 may transmit the identifier to call data device 125 and, in response, call data device 125 may transmit the call data associated with the identifier to intermediate device 120. Subsequently, intermediate device 120 may transmit the call data to endpoint 110, as well as provide a call connection between endpoint 105 and endpoint 110.

As a result of the foregoing, environment 100 may enable call data to be delivered to a destination even when one or more intermediate devices in the call path may be unable to handle the call data. Since concepts have been broadly described in relation to environment 100, variations to the above concepts will be discussed further below.

Additionally, it will be appreciated that environment 100 is exemplary in terms of, among other things, the number of devices, the connections between and/or among the devices, the ability to handle the call data, etc. For example, environment 100 may be modified such that it does not include intermediate device 120. In such an instance, intermediate device 115 may connect to endpoint 110 (as indicated by a dashed arrow) and call data device 125 may connect to endpoint 110 (as indicated by a dashed arrow). In this case, intermediate device 115 may be unable to transmit the call data to endpoint 110. Thus, intermediate device 115 may transmit the call and the identifier to endpoint 110, and endpoint 110 may retrieve the call data from call data device 125 based on the identifier.

Figure 2:
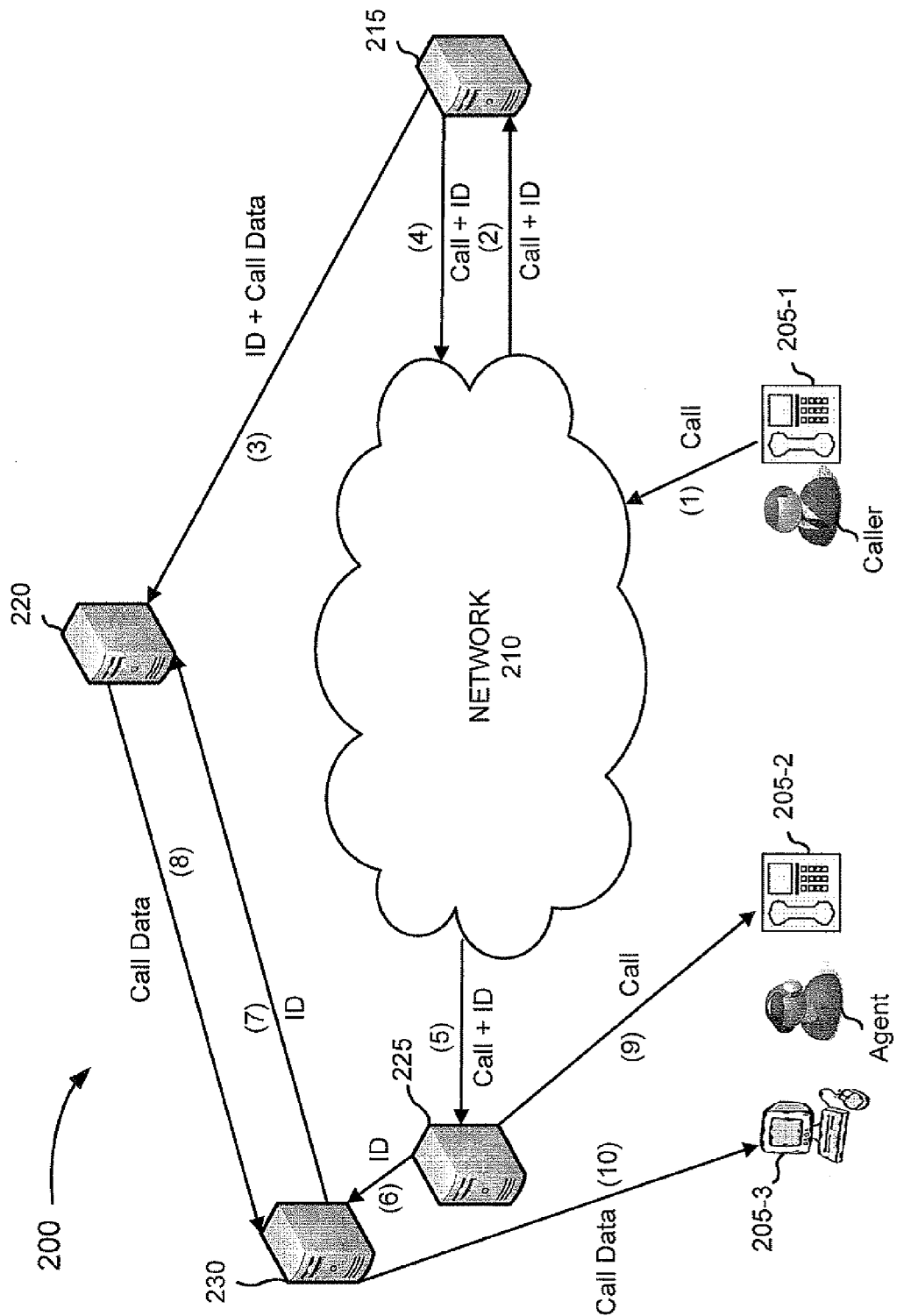
FIG. 2 is a diagram illustrating an exemplary environment in which systems and methods described herein may be implemented.

As provided below, the concepts are described further in reference to another exemplary environment, as illustrated in FIG. 2. In this exemplary environment, for purposes of discussion, the device that is unable to handle the call data includes an Interactive Voice Response (IVR) device; however, in other instances, the device may correspond to another device in the exemplary environment.

FIG. 2 is a diagram illustrating an exemplary environment 200. As illustrated, environment 200 may include, among other devices, terminals 205-1, 205-2 and 205-3, a network 210, an IVR server 215, a call data server 220, an automatic call distribution (ACD) server 225, and a computer telephony integrated (CTI) server 230.

Each of terminals 205-1 and 205-2 may include a user device having communication capability. For example, terminals 205-1 and 205-2 may include a telephone, a computer, a PDA, etc. Terminal 205-3 may include a user device having communication capability. For example, terminal 205-3 may include a computer or some other type of computational device. Terminal 205-1 may be operated by a caller (e.g., a customer). Terminals 205-2 and 205-3 may be operated by an agent (e.g., of a call center).

Network 210 may include any type of network, such as a wide area network (WAN), a local area network (LAN), a telephone network (e.g., a public switched telephone network (PSTN) or a wireless network), the Internet, a satellite network, a private network, etc., or a combination of networks. Network 210 may include at least one device (not illustrated) to handle a telephone call from terminals, such as terminal 205-1 and/or terminal 205-2.

IVR server 215 may include a device that provides caller service support through an interactive voice menu system. The interactive voice menu may include pre-recorded voice messages and/or dynamically generated voice messages. The caller may indicate a response to a voice prompt using, for example, a telephone dial pad (e.g., touch-tone), or open dialog (e.g., voice commands, such as words, phrases, etc.,) spoken by the caller. Additionally, IVR server 215 may translate text into spoken output for the caller. IVR server 215 may also identify and segment the caller, as well as transfer a call to a terminal or call center agent. IVR server 215 may be connected to various back-end databases and/or application servers to retrieve records and information during the course of the call.

Call data server 220 may include a device that manages the call data. For example, call data server 220 may include one or more databases. In one implementation, the call data may be managed (e.g., stored, retrieved, processed, etc.) based on an identifier, as will be described in greater detail below.

ACD server 225 may include a device that distributes incoming calls to one or more terminals or agents. ACD server 225 may manage calls, queues, agent groups, teams, skills, caller service requests, and/or priorities. ACD server 225 may also provide for computer calls from the Web, text chat, e-mail, fax, etc. ACD server 225 may be connected to various back-end databases (e.g., an event-oriented database for calls and agent state changes, call recording, etc.).

CTI server 230 may include a device that provides an interaction between caller contact channels (e.g., voice, e-mail, Web collaboration, fax, text chat, etc.) and a computational device, such as a computer. CTI server 230 may provide call-related information to a terminal, such as a computer, for visual display. Call information may include a name, an address, an account number, a caller's number (e.g., an ANI), a number dialed (e.g., a DNIS), a caller profile, etc., associated with the caller. CTI server 230 may also provide visual call control (e.g., answer, hang up, hold, etc.), call monitoring, etc. CTI server 230 may route a call to its proper extension and/or poll one or more back-end databases to relay call information to the appropriate terminal.

In addition to exemplary devices in environment 200, FIG. 2 illustrates an exemplary call scenario that may be associated with the concepts described herein. As illustrated, various segments of the call have been numbered (e.g., (1), (2), etc.) to indicate a sequence of call events, as well as information associated with that segment of the call. It will be appreciated that the numbering and the information associated with each segment is for illustration and discussion purposes only.

For purposes of discussion, assume that a caller places a call at terminal 205-1 (as indicated by call (1)) to a call center. The call may be received by network 210. Network 210 may assign an identifier (ID) to the call. For example, in some environments, a network may assign an ID to a call, for example, for troubleshooting, etc. The ID may include, for example, a character string that identifies the call. Network 210 may route the call to IVR server 215. Network 210 may include the ID along with the call (as indicated by call+ID (2)). It will be appreciated that in other implementations network 210 may not an assign an ID to the call.

IVR server 215 may provide a voice menu to the caller in which call data may be generated based on the caller's response(s). For example, the call data may include account information and/or a customer ID. As previously mentioned, IVR server 215 may correspond to a device that is unable to deliver the call data to a device in the call path. For example, IVR server 215 may be unable to forward the call data to a device in network 210 and/or ACD server 225. In such an instance, IVR server 215 may transmit the call data along with the ID to another device, such as call data server 220 (as indicated by ID+call data (3)). Additionally, IVR server 215 may route the call via network 210 to ACD server 225. As illustrated, IVR server 215 may provide the call and ID to network 210 (as indicated by call+ID (4)). Network 210 may subsequently forward the call and ID to ACD server 225 (as indicated by call+ID (5)). In another implementation, for example, where network 210 did not assign an ID, IVR server 215 may assign an ID to the call and/or the call data.

ACD server 225 may transmit the ID to CTI server 230 (as indicated by ID (6)). CTI server 230 may issue a request for the call data to call data server 220 based on the ID (as indicated by ID (7)). Call data server 220 may provide the call data associated with the ID to CTI server 230 (as indicated by call data (8)). ACD server 225 may route the call to terminal 205-2 and the call data may be sent to terminal 205-3 (as indicated by call (9) and call data (10)).

Although FIG. 2 illustrates an exemplary environment 200, in other implementations, environment 200 may include fewer, additional, or different devices than those illustrated in FIG. 2. Additionally, or alternatively, in other implementations, devices may be combined into a single device. For example, ACD server 225 and CTI server 230 may be combined into a single device. Additionally, or alternatively, a device may be implemented as two or more devices. For example, IVR server 215 may be implemented as multiple, possibly distributed, devices. Additionally, or alternatively, environment 200 may include a different arrangement and/or configuration than the arrangement and the configuration depicted and described in relation to FIG. 2. Additionally, or alternatively, it will be appreciated that one or more devices in FIG. 2 may perform the functions of one or more other devices depicted in FIG. 2. The connections in FIG. 2 may be direct, indirect, as well as wired and/or wireless.

Further, it will be appreciated that the call data may be generated at multiple devices in environment 200 and/or by any device in the call path. It will also be appreciated that the call data may be transmitted during a call phase other than the connection establishment phase. For example, the call data may be generated during the connection phase, the disconnect phase, etc., of the call. Further, the call data may not necessarily be "generated" during the call and/or a phase of the call. Rather, the call data may be, for example, previously stored call data.

Figure 3:
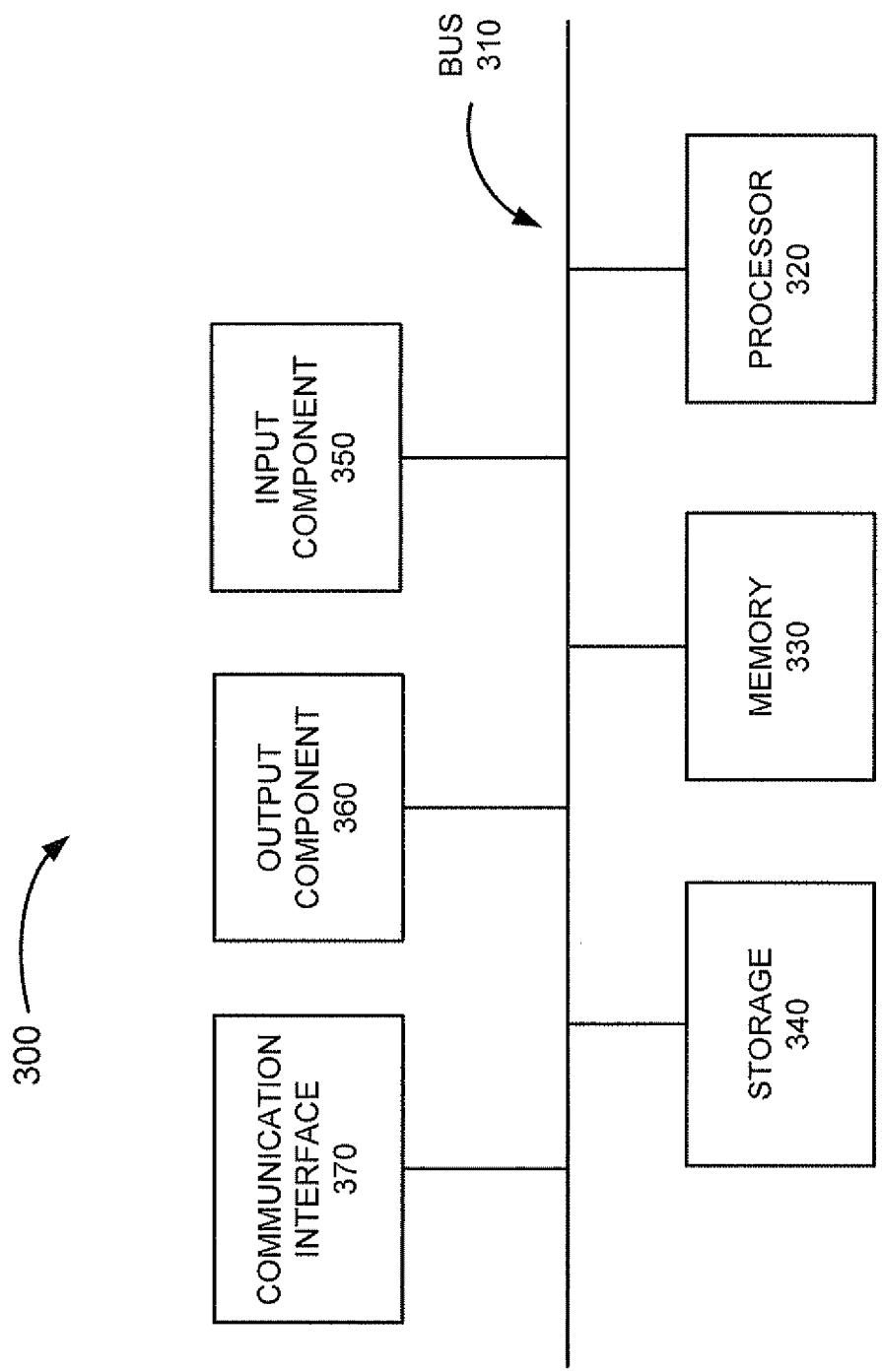
FIG. 3 is a diagram illustrating exemplary components that may correspond to one or more of the devices of the exemplary environment depicted in FIG. 2.

FIG. 3 is a diagram illustrating exemplary components of a device 300 that may correspond to one or more of the devices depicted in FIGS. 1 and 2. As illustrated, device 300 may include, among other things, a bus 310, a processor 320, a memory 330, a storage 340, an input component 350, an output component 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and execute instructions.

Memory 330 may include a device that stores data and/or instructions related to the operation and use of device 300. For example, memory 330 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 340 may include a device that stores data, such as a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive. The term "computer-readable medium" is intended to be broadly interpreted to include a physical or a logical memory device.

Memory 330 and/or storage 340 may also include a storing device external to and/or removable from device 300, such as a Universal Serial Bus (USB) memory stick, a hard disk, etc.

Input component 350 may include a mechanism that permits a user to input information to device 300, such as a keyboard, a keypad, a mouse, a button, a switch, a microphone, voice recognition logic, etc. Output component 360 may include a mechanism that outputs information to a user, such as a display, a speaker, one or more light emitting diodes (LEDs), etc.

Communication interface 370 may include any transceiver-like mechanism that enables device 300 to communicate with other devices and/or systems. For example, communication interface 370 may include an Ethernet interface, an optical interface, a coaxial interface, a radio interface, or the like.

As will be described in detail below, device 300 may perform certain operations relating to the implementations described herein. Device 300 may perform these operations in response to processor 320 executing software instructions contained in a computer-readable medium, such as memory 330.

The software instructions may be read into memory 330 from another computer-readable medium or from another device via communication interface 370. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

According to the concepts described herein, an identifier may be associated with the call and/or the call data. In one implementation, the identifier may be unique. While such an implementation may ensure that the correct call data reaches its destination, this implementation may require customization of one or more of the devices in environment 200 to generate the unique identifier.

In other implementations, the identifier may include a combination of the ANI and the DNIS (also referred to as a composite identifier (CID)). In such an implementation, devices in environment 200 may utilize existing information (i.e., the ANI and DNIS) associated with the call to serve as the identifier. It will be appreciated, however, that the CID may not always yield a unique identifier. For example, two calls associated with two different callers from the same office building may have the same ANI. Similarly, these two callers may have dialed the same destination number. However, such circumstances may be considered a degenerative case. In this regard, the CID may provide an adequate assurance that the correct call data reaches the destination device. A more detailed description relating to various implementations relating to the identifier is described below.

A unique identifier or a network identifier (NID) may be generated and associated with the call and/or the call data. The NID may be provided to one or more devices along the call path in a network environment, such as environment 200. In this regard, the NID may correlate with any segment or leg of the call.

Depending on the protocol employed in the call path, the NID may be packaged in various ways. Described below is one implementation in which one or more information elements of a Q.931 message may include the NID. As specified in the Q.931 standard, an information element may be a single-octet information element or a variable length information element. In either case, the information element(s) may include the NID. For example, with respect to the single octet formats (e.g., type 1 or type 2), the NID may be inserted in the information element at bit 37 (for type 1) or bit 34 (for type 2) of the Q.931 message. Further, the appropriate Codeset, as specified in the Q.931 standard, may be selected. Provided below is an exemplary call setup in a switch:

Setup CRV=05756 (Orig) Prot=Q931 15:31:31.468 05-08-07
Bearer_Cap 89 90 21 8F (Restrict, Rate=64 K, Adapt to 56K)
Channel_Id A9 83 81 (Excl, Intf=0, Chan=1)
Called_Num (National) 6007280000
Shift to Codeset 6
IE=37 (Codeset 6) 7B F5 01 51 15 00 00 4F E8 90 31 03
The NID may be provided in the following exemplary format:

| Octet 1 | b7-b5 | Encoding scheme |
| | b4-b0 | Type of digits |
| Octet 2 | b7-b0 | Originating Switch ID LSB (least significant bits) |
| Octet 3 | b7-b6 | Originating trunkgroup LSB |
| | b5-b0 | Originating Switch ID MSB (most significant bits) |
| Octet 4 | b7-b0 | Originating trunkgroup (cont) |
| Octet 5 | b7-b4 | Originating port/member LSB |
| | b3-b0 | Originating trunkgroup MSB (cont) |
| Octet 6 | b7-b0 | Originating port/member (cont) |
| Octet 7 | b7 | Spare |
| | b6-b0 | Originating port/member MSB (cont) |
| Octet 8 | b7-b0 | Time Point One LSB |
| Octet 9 | b7-b0 | Time Point One (cont) |
| Octet 10 | b7-b0 | Time Point One (cont) |
| Octet 11 | b7-b0 | Time Point One MSB (cont) |
| Octet 12 | b7-b3 | Spare |
| | b2-b0 | Sequence Number |

A translation of the Codeset 6 data is provided below:
96 37 0C 7B 74 02 17 82 BF 0E F5 78 B5 31 00
96=Shift to Codeset 6
37=IE used to indicate NID
0C=Length, in octets, of data following.
7B F5 01 51 15 00 00 4F E8 90 31 03
Encoding Scheme/Type of Digits

| 7B | 0111 | 1011 | Encoding Scheme = binary |
| | 011- | ------ | Type of digits = NID |
| | ------ | 1011 | |

Originating Switch ID

| F5 | 1111 | 0101 |
| 01 | ---00 | 0001 |
| Combined = | | 00 0001 1111 0101 |
| 0x = | | 0 1 F 5 |
| 0x01F5 = | | Switch 501 |

Originating Trunk Group

| 01 | 00--- | ------ | | LSB |
| 51 | 0101 | 0001 | | |
| 15 | ------ | 0101 | | MSB |
| Combined = | | 01 0101 0100 0100 | |
| 0x = | | 1 5 4 4 | |
| 0x1544 = | | Trunkgroup 5444 | |

Originating Port/Member

| 15 | 0001 | ----- | | LSB |
| 00 | 0000 | 0000 | | |
| 00 | -000 | 0000 | | MSB |
| Combined = | 000 0000 0000 0000 0001 | | |
| 0x = | 0 0 0 0 1 | | |
| 0x00001 = | Port/member 1 | | |

Time Point 1

| 4F | | LSB |
| E8 | | |
| 90 | | |
| 31 | | MSB |
| Combined = | 0x3190E84F | |
| 0x3190E84F = | 831580239 seconds passed | |

Sequence Number
03 - - - 011 | Sequence 3

As previously described above, the identifier may include a combination of the ANI and the DNIS or a CID. In the degenerative case when two calls that share the same ANI and the same DNIS, a device that assigns the ID may select from a DNIS pool. For example, IVR server 215 may alter the DNIS to a DNIS-1 for the first call and a DNIS-2 for the second call. For example, if the DNIS corresponds to the call center having a telephone number of 800-123-0000, then the DNIS pool may include extensions relating to an agent's direct line. In this regard, for example, DNIS-1 may correspond to a telephone number, such as 800-123-0001, and DNIS-2 may correspond to a telephone number, such as 800-123-0002. The number of DNIS numbers in the DNIS pool may depend on, for example, the probability of receiving calls from the same ANI, the time interval between storing the call data to call data server 220 and retrieving the call data from call data server 220, and/or the behavior of call data server 220 if a failure occurs (e.g., a storage failure associated with call data, a retrieval failure associated with call data, etc.).

In another implementation, when the ANI/DNIS combination is not unique, the IVR server 215 may append a sequence number to the DNIS field. For example, the DNIS field is typically 15 digits. However, within the domestic calling realm, the DNIS utilizes only 10 digits. In this regard, the IVR server 215 may append (e.g., up to a 5 digit) sequence number to the DNIS so that the ANI/DNIS combination is unique. In one implementation, the IVR server 215 may select from a pool of sequence numbers.

In still another implementation, the CID may be provided without employing a DNIS pool. In the degenerative case when two calls that share the same CID are received at the same time, a device that assigns the ID may suspend or delay one of the calls. For example, IVR server 215 may, for example, suspend or delay one of the calls until the call data associated with the other call is retrieved from call data server 220. In this regard, the delay may last a time interval from a time when the call data is stored (on call data server 220) to a time when the call data is retrieved (from call data server 220). In one implementation, call data server 220 may alert IVR server 215 when IVR server 215 attempts to store call data having the same CID. Call data server 220 may then suspend or delay one of the calls. Alternatively, IVR server 215 may recognize the existence of identical CIDs and suspend or delay one of the calls. For example, IVR server 215 may enter a timeout period before transmitting the call data and the CID belonging to one of the two calls. Additionally, or alternatively, call data server 220 may alert IVR server 215 when call data associated with the CID has been retrieved, in which case IVR server 215 may transmit and/or store the call data associated with the other call having the same CID on call data server 220.

It will be appreciated that other implementations to manage this situation not specifically mentioned herein may be employed. For example, IVR server 215 may disconnect and/or fail the call, or suspend the call for a particular period of time and then drop the call, etc.

As previously described, one or more devices, such as IVR server 215 and/or call data server 220, may employ various mechanisms to ensure that call data having the same CIDs are not stored on call data server 220 at the same time. Such mechanisms may ensure that the correct call data is delivered to the destination device. Described below are other mechanisms that may be implemented within environment 200 relating to the management of the call data when the DNIS pool is not employed.

Figure 4:
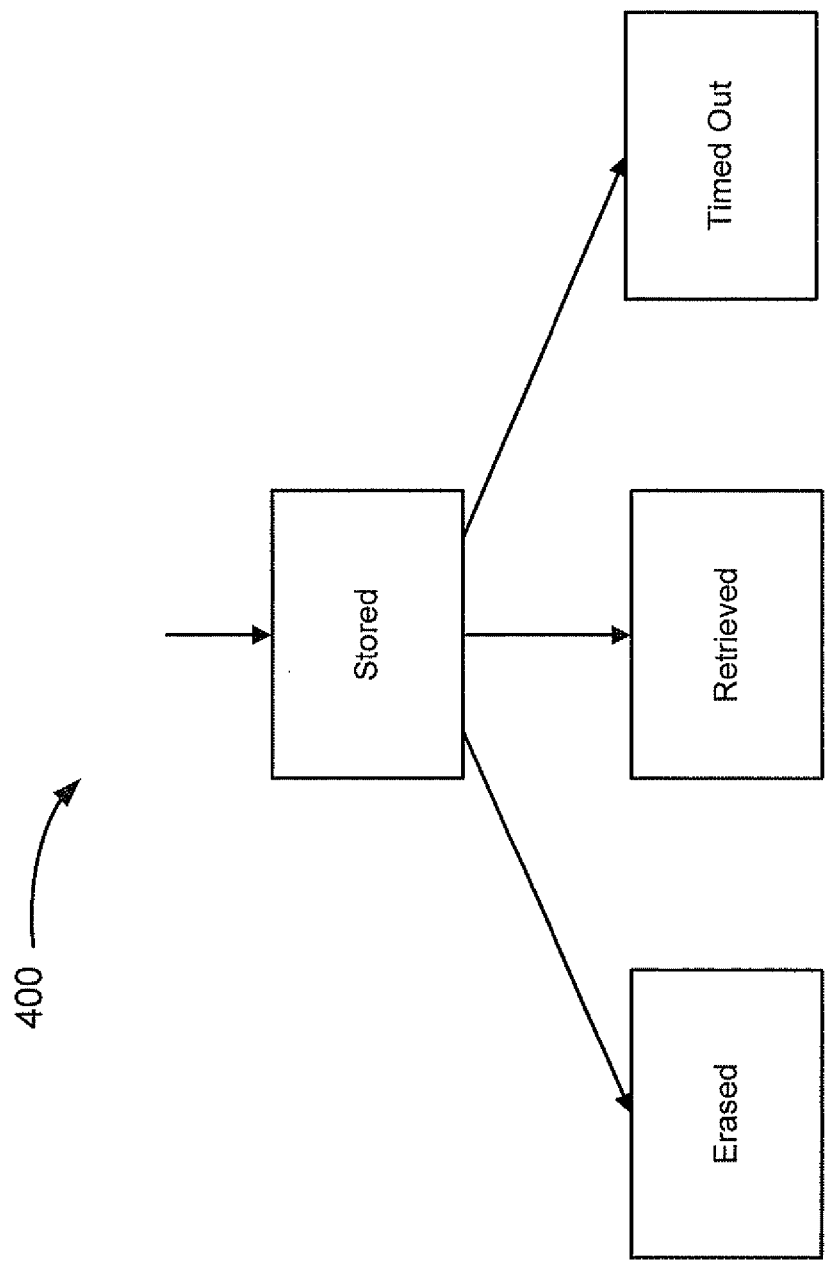
FIG. 4 is a diagram illustrating exemplary identifier states.

FIG. 4 is a diagram illustrating exemplary CID states in relation to call data server 220. As illustrated, call data server 220 may initially set the CID to a "stored" data state when a request to store the call data is received. While in the "stored" data state, call data server 220 may not accept a subsequent store request that includes the same ANI/DNIS combination (i.e., the same CID). In this way, call data having the same CIDs may not be stored at the same time.

Typically, the CID will proceed to a "retrieved" data state as a result of a retrieve request from a device, such as CTI server 230. In addition to these data states, other data states may be employed. For example, a party, such as the agent, may erase the CID by issuing an erase request. Additionally, or alternatively, the CID may enter a "timed out" data state, when, for example, an "erased" data state or a "retrieved" data state did not occur within a configurable time interval set on call data server 220. To ensure that the correct data is delivered to the destination device when the DNIS pool is not employed, the "stored" data state may progress to one of these states (i.e., "retrieved," "erased," or "timed out") before a duplicate CID is stored on call data server 220. It will also be appreciated that one or more of these data states may also be employed in instances when the identifier is unique. Further, it will be appreciated that the call data associated with the CID may follow the data state of the CID.

Described below are exemplary call scenarios in which the above-mentioned data states may be implemented. FIGS. 5-8 are diagrams illustrating exemplary call scenarios applicable to the concepts described herein. It will be appreciated that, among other things, the order, the content, and/or the devices involved in each segment of the call are exemplary. Further, it is to be understood that additional, fewer, different segments of the call may occur during the course of the call scenario.

Figure 5:
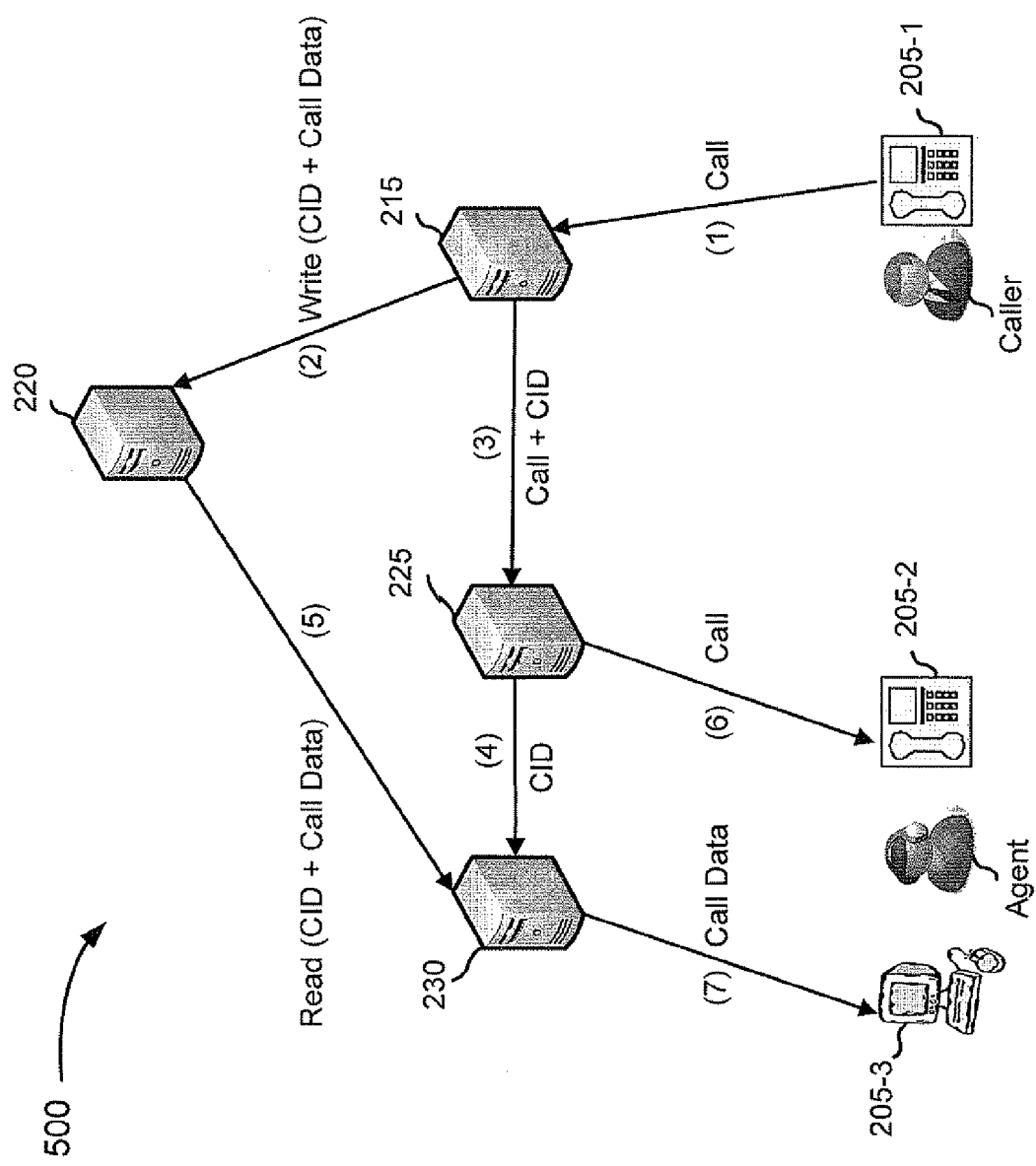
FIGS. 5-8 are diagrams illustrating exemplary call scenarios applicable to the concepts described herein.

FIG. 5 is a diagram illustrating a typical progression from the stored data state to the retrieved data state. For purposes of discussion, the call scenario takes place in an exemplary environment 500 that includes devices analogous to those previously described with respect to FIG. 2. As illustrated in FIG. 5, the caller may place a call (as indicated by call (1)) that may be received by IVR server 215. During the course of the call, call data may be generated and/or received at IVR server 215. IVR server 215 may recognize that it is unable to forward the call data to ACD server 225. In such an instance, IVR server 215 may associate the CID with the call and/or the call data, and write the CID and the call data to call data server 220 (as indicated by write–CID+call data (2)). The CID and the call data may be in the stored data state on call data server 220. IVR server 215 may route the call and the CID to ACD server 225 (as indicated by call+CID (3)).

ACD server 225 may provide the CID to CTI server 230 (as indicated by CID (4)). CTI server 230 may read the CID and the call data from call data server 220 (as indicated by read (CID+call data (5)). At such time, the CID and the call data may be in the retrieved data state. ACD server 225 may route the call to terminal 205-2 and the call data may be sent to terminal 205-3 (as indicated by call (6) and call data (7)). It will be appreciated once the CID and the call data transition from the stored data state to the retrieved data state, call data with the same CID may be stored at call data server 220, if this should be the case.

Figure 6:
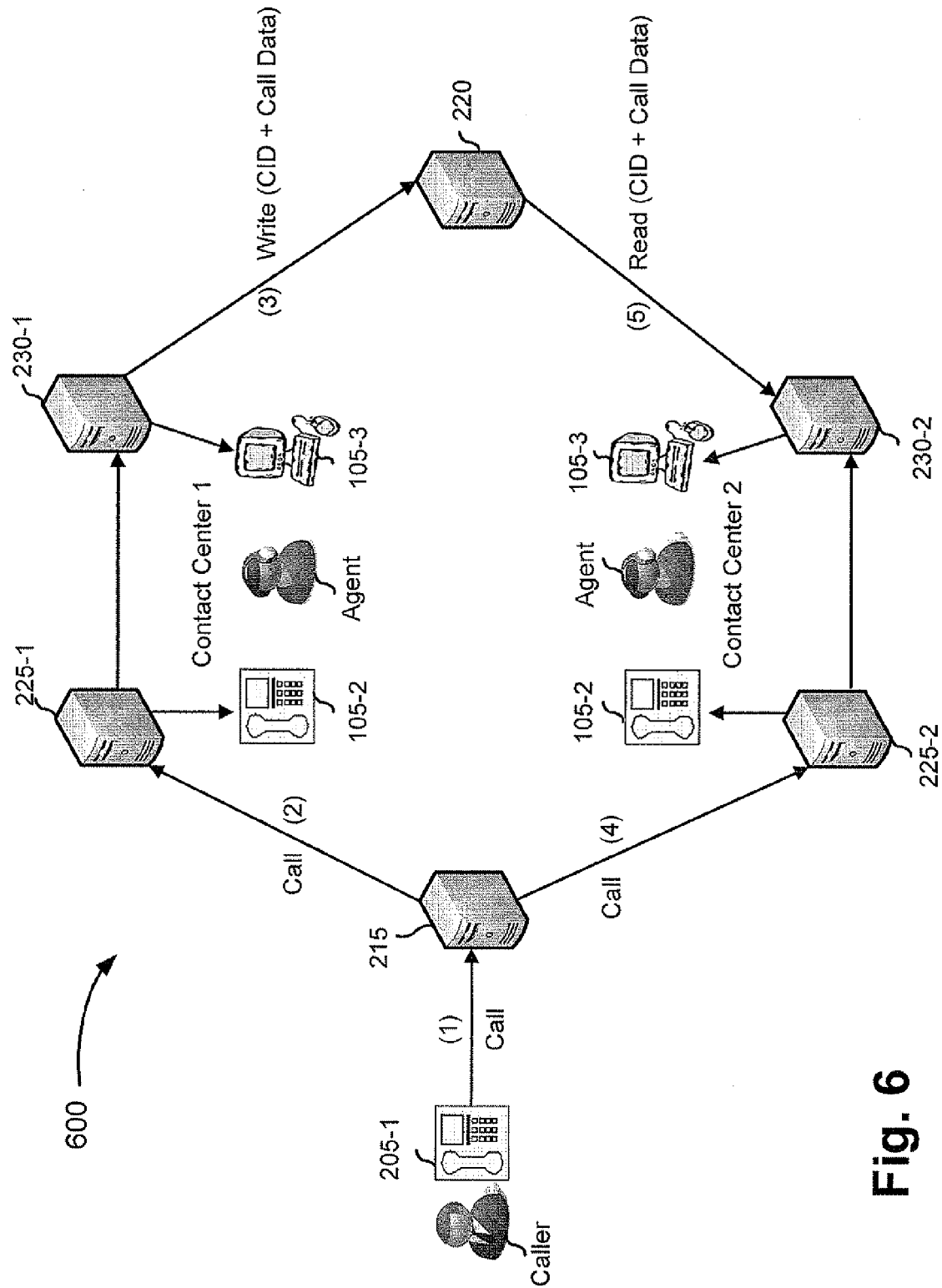

FIG. 6 is a diagram illustrating another progression from the stored data state to the retrieved data state. However, in this call scenario, the call may be transferred from one agent to another agent and/or from one contact center (e.g., contact center 1) to another contact center (e.g., contact center 2). For purposes of discussion, the call scenario takes place in an exemplary environment 600 that includes devices analogous to those previously described with respect to FIG. 2.

As illustrated in FIG. 6, the caller may place a call (as indicated by call (1)) that may be received by IVR server 215. IVR server 215 may route the call to ACD server 225-1 (as indicated by call (2)). In this call scenario, IVR server 215 may not generate and/or receive call data. The call may be handled by the agent at contact center 1. During the course of the call, the agent may determine that the call needs to be transferred (e.g., to another contact center and/or agent), and that call data needs to be transferred with the call.

As illustrated, CTI server 230-1 may write the CID and the call data to call data server 220 (as indicated by write–CID+call data (3)). The CID and the call data may be in the stored data state on call data server 220. The agent at contact center 1 may transfer the call to the contact center 2 either directly or via IVR server 215. As illustrated in FIG. 6, IVR server 215 may transfer the call to contact center 2 (as indicated by call (4)). When contact center 2 receives the call, CTI server 230-2 may retrieve the call data (as indicated by read–CID+Call data (5)), and the data state may transition from the stored data state to the retrieved data state. The agent at contact center 2 may handle the call with the call data.

Figure 7:
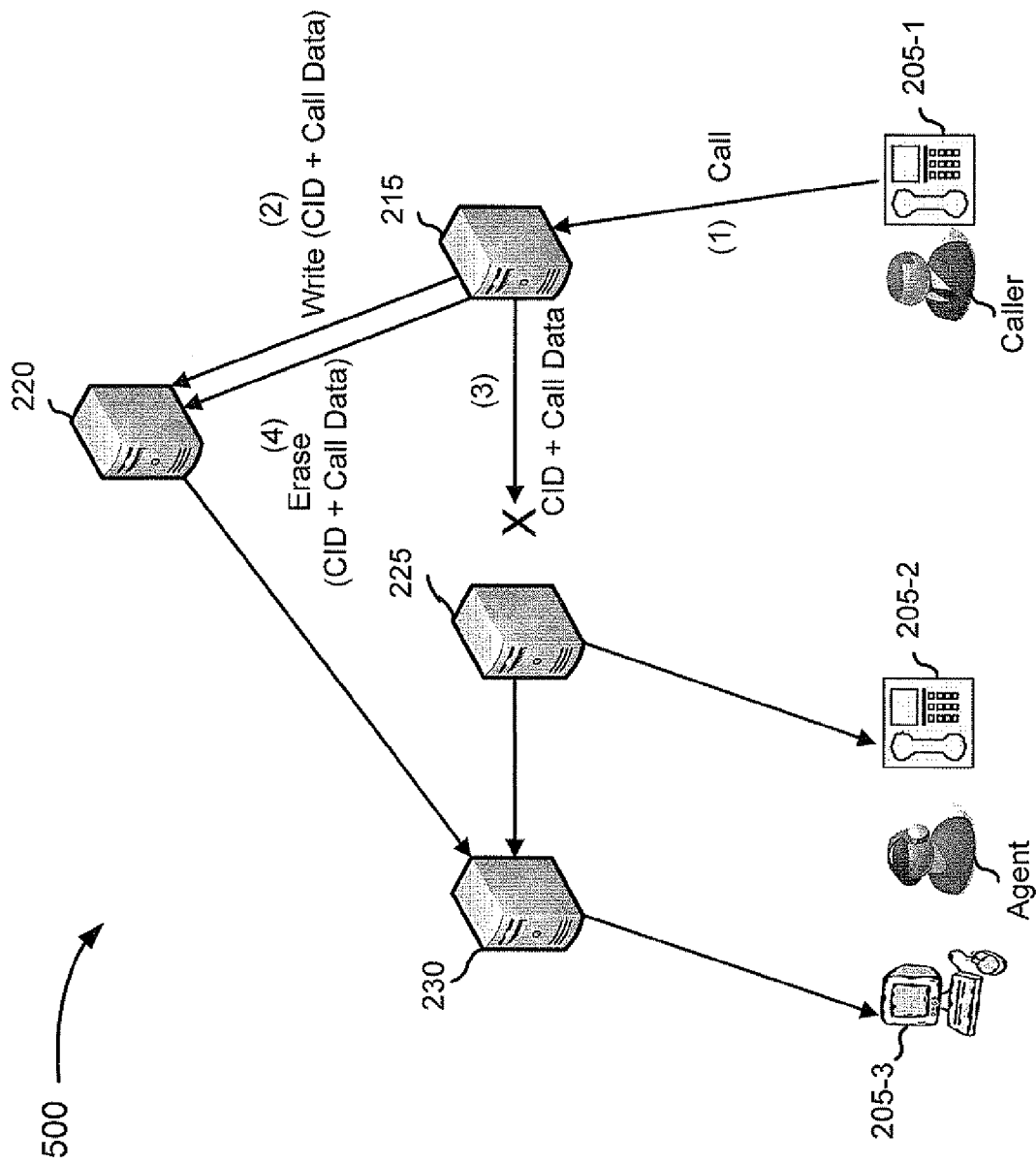

FIG. 7 is a diagram illustrating a progression from the stored data state to the erased data state. For purposes of discussion, the call scenario takes place in environment 500.

As illustrated in FIG. 7, the caller may place a call (as indicated by call (1)) that may be received by IVR server 215. During the course of the call, call data may be generated and/or received at IVR server 215. IVR server 215 may recognize that it is unable to forward the call data to ACD server 225. In such an instance, IVR server 215 may associate the CID with the call and/or the call data, and may write the CID and the call data to call data server 220 (as indicated by write–CID+call data (2)). The CID and the call data may be in the stored data state on call data server 220.

IVR server 215 may attempt to route the call and the CID to ACD server 225 (as indicated by call+CID (3)). However, IVR server 215 may be unable to route the call (e.g., it receives a busy signal perhaps after a number of retries). In such an instance, IVR server 215 may erase the CID and the call data from call data server 220 (as indicated by erase–CID+call data (4)). In such an instance, the CID and the call data may transition from the stored data state to the erased data state.

Figure 8:
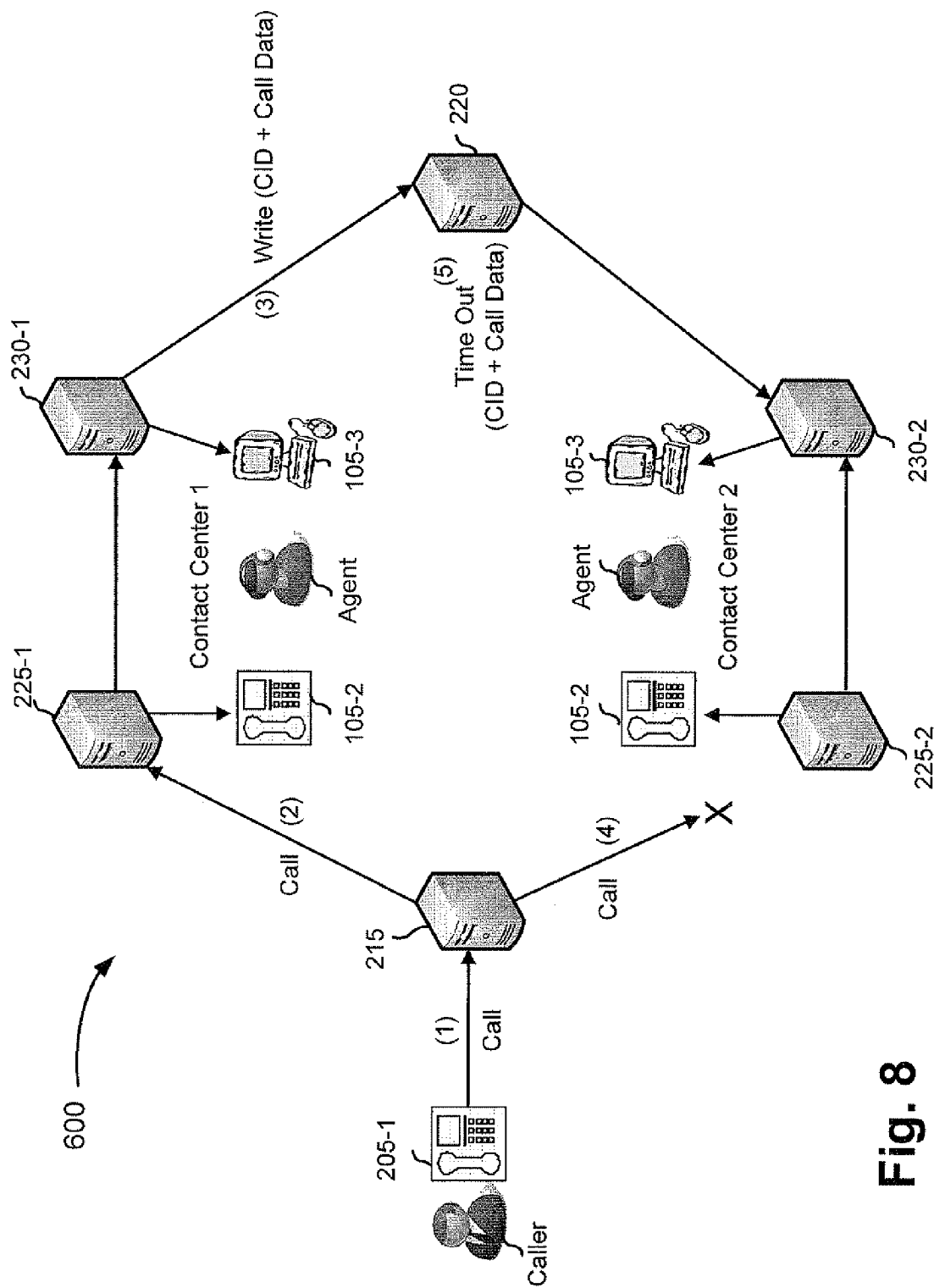

FIG. 8 is a diagram illustrating a progression from the stored data state to the timed out data state. For purposes of discussion, the call scenario takes place in environment 600.

As illustrated in FIG. 8, the caller may place a call (as indicated by call (1)) that may be received by IVR server 215. IVR server 215 may route the call to ACD server 225-1 (as indicated by call (2)). In this call scenario, IVR server 215 may not generate and/or receive call data. The call may be handled by the agent at contact center 1. During the course of the call, the agent may determine that the call needs to be transferred (e.g., to another contact center and/or agent), and that call data needs to be transferred with the call.

As illustrated, CTI server 230-1 may write the CID and the call data to call data server 220 (as indicated by write–CID+call data (3)). The CID and the call data may be in the stored state on call data server 220. The agent at contact center 1 may transfer the call to contact center 2 (as indicated by call (4)). IVR server 215 may attempt to transfer the call to contact center 2 (as indicated by call (4)); however, IVR server 215 may be unable to transfer the call (e.g., it receives a busy signal perhaps after a number of retries). In this situation, if contact center 1 does not perform an erase, then the CID and the call data may eventually be timed out (as indicated by time out–CID+call data (5)). In such an instance, the CID and the call data may transition from the stored state to the timed out state. Call data server 220 may or may not transmit a message to another device indicating this change of state. However, in one implementation, call data server 220 may transmit a timed out message to the device that stored the CID and the call data. For example, call data server 220 may transmit the timed out message to CTI server 230-1.

As illustrated in connection with FIGS. 5-8, a write corresponded to storing the CID and the call data, a read corresponded to retrieving the CID and the call data, and an erase or a time out corresponded to erasing the CID and the call data have been described. It is to be understood that these operations were described in a generic form. Depending on the environment in which the concepts described herein are implemented, the messages to perform these operations (e.g., store, retrieve, and/or erase) may take many forms. Described below are some exemplary IP messages (e.g., HTTP messages having an Extensible Markup Language format) that may be employed for accomplishing these operations.

Below is an exemplary store message that may be received by call data server 220 for storing the CID and the call data:

```
<STORE>
  <ANI>7195351300</ANI>
  <DNIS>8001234567</DNIS>
  <DATA> Data to be sent 1234567</DATA>
</STORE>
```

Below is an exemplary store message response that may be transmitted by call data server 220:

```
<STORE RESPONSE>
  <CODE>200</CODE>
  <ANI>7195351300</ANI>
  <DNIS>8001234567</DNIS>
</STORE RESPONSE>
```

Below is an exemplary retrieve message that may be received by call data server 220 for retrieving the CID and the call data:

```
<RETRIEVE>
  <ANI>7195351300</ANI>
  <DNIS>8001234567</DNIS>
</RETRIEVE>
```

Below is an exemplary retrieve response message that may be transmitted by call data server 220:

```
<RETRIEVE RESPONSE>
  <CODE>200</CODE>
  <ANI>7195351300</ANI>
  <DNIS>8001234567</DNIS>
  <DATA> Data to be sent 1234567</DATA>
</RETRIEVE RESPONSE>
```

Below is an exemplary erase message that may be received by call data server 220:

```
<ERASE>
  <ANI>7195351300</ANI>
  <DNIS>8001234567</DNIS>
</ERASE>
```

Below is an exemplary erase response message that may be transmitted by call data server 220:

```
<ERASE RESPONSE>
<CODE>200</CODE>
<ANI>7195351300</ANI>
<DNIS>8001234567</DNIS>
</ERASE RESPONSE>
```

Below is an exemplary timed out message that may be transmitted by call data server 220:

```
<TIMED OUT>
<CODE>410</CODE>
<ANI>7195351300</ANI/>
<DNIS>8001234567</DNIS>
</TIMED OUT>
```

The exemplary messages above may be modified depending on the identifier. For example, instead of the ANI and the DNIS, the NCID may be employed (e.g., <NCID>1234 . . . </NCID>). Also, the exemplary messages may be modified depending on the DNIS. For example, instead of the DNIS, an alternate DNIS may be included in a message when the DNIS is not available (e.g., <ALTERNATE DNIS>7191234567</ALTERNATE DNIS>). Also, the exemplary message may include different codes (e.g., 2XX, 3XX, etc.) that align with the HTTP protocol. Additionally, or alternatively, special codes may be utilized. For example, the code (599) may be used to indicate that the identifier is not found.

It will be appreciated that the content of the exemplary messages are exemplary. Thus, in other implementations, any of the exemplary messages may include fewer, different, or additional content than that described above.

Given the possibility that call data may include sensitive information (e.g., an account number, personal information, etc.), the concepts described herein may be implemented in a manner that provides for a particular level of security. For example, in compliance with the World Wide Web Consortium (W3C) secure framework architecture, one or more of the following security measures may be employed, such as, authentication, authorization, confidentiality, integrity, and/or non-repudiation. Thus, encryption, user names and passwords, public keys, private keys, etc., may be implemented within the call scenarios described to ensure that a measure of security is maintained.

Figure 9:
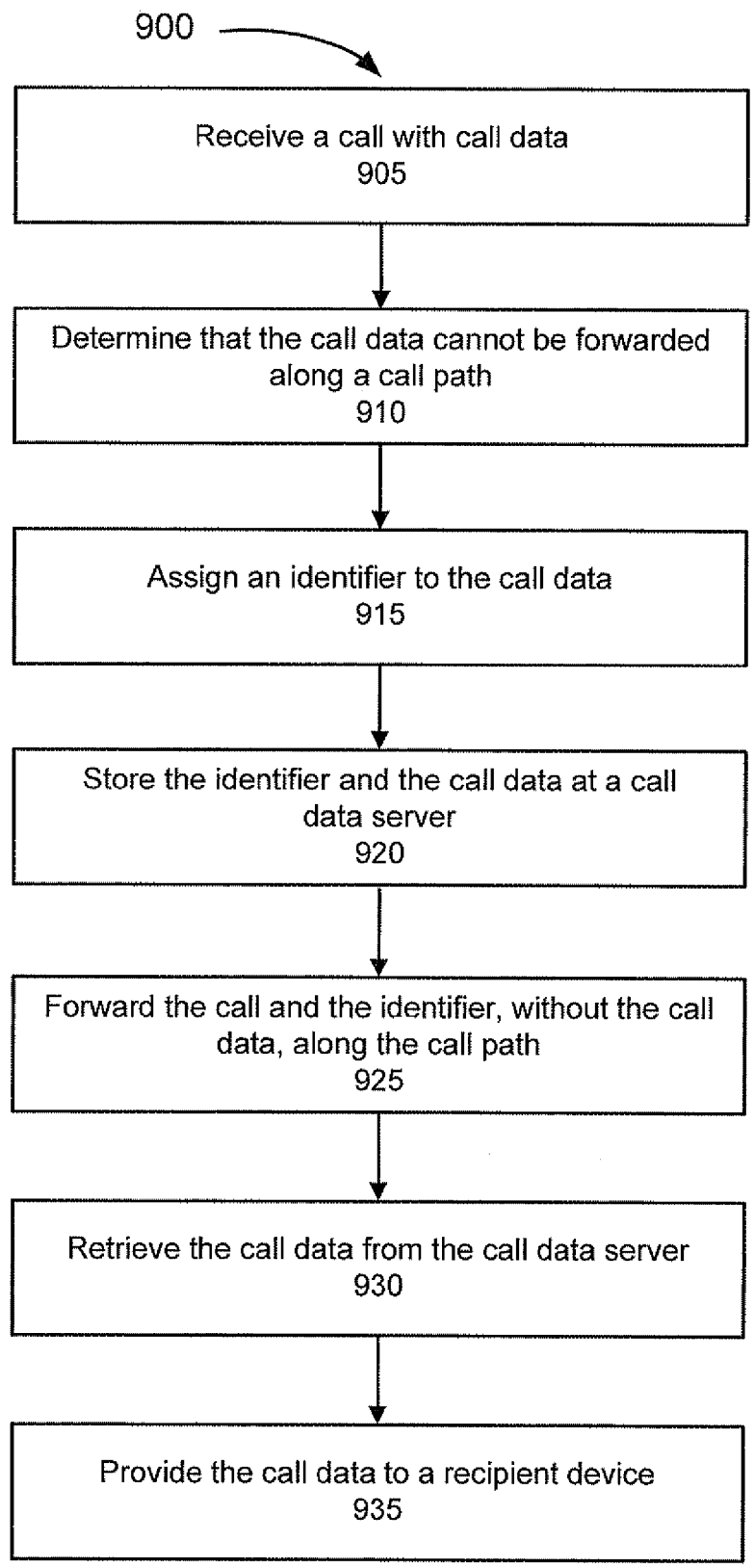
FIG. 9 is a flow diagram illustrating an exemplary process associated with the concepts described herein.

FIG. 9 is a flow diagram illustrating an exemplary process 900 that may be associated with the concepts described herein. In addition to FIG. 9, process 900 may be described in reference to FIG. 2. Process 900 may be performed by one or more of the devices illustrated in FIG. 2.

Process 900 may begin with receiving a call with call data (block 905). For example, an endpoint, such as terminal 205-1 of environment 200, may place a call that is received by IVR server 215. IVR server 215 may generate call data based on IVR server 215's interaction with a user of terminal 205-1.

It may be determined that the call data cannot be forwarded along a call path (block 910). IVR server 215 may determine that the call needs to be routed to a device in network 210 and/or ACD server 225. In this instance, IVR server 215 may determine that it is unable to forward the call data along this call path.

An identifier to the call data may be assigned (block 915). IVR server 215 may assign an identifier to the call data. As previously described, the identifier may include a unique identifier (e.g., a NID), or an identifier based on an ANI/DNIS combination (e.g., a CID). In the instance that a CID is employed, it will be appreciated that a DNIS pool may or may not be utilized, as previously described. Alternatively, a number may be attached to the DNIS, as previously described.

The identifier and the call data may be stored at a call data server (block 920). IVR server 215 may store the call data and the identifier at call data server 220. For example, IVR server 215 may transmit a store request that includes the identifier and the call data to call data server 220.

The call and the identifier may be forwarded along the call path without the call data (block 925). IVR server 215 may transfer the call and the identifier to ACD server 225.

The call data may be retrieved from the call data server (block 930). For example, ACD server 225 may provide CTI server 230 with the identifier. CTI server 230 may retrieve the call data from call data server 220 based on the identifier. For example, CTI server 230 may transmit a retrieve request that includes the identifier to call data server 220. Call data server 220 may transmit a response that includes the call data to CTI server 230. The response may or may not include the identifier.

The call data may be provided to a destination device (block 935). CTI server 230 may transmit the call data to an endpoint, such as terminal 205-3.

Although FIG. 9 illustrates an exemplary process 900, in other implementations, fewer, additional, or different processes may be performed. It will also be appreciated that variations with respect to which device or devices generated the call data and what phase of the call the call data was generated, may vary depending on, among other things, the devices involved, the type of call data, etc. Further, it is to be understood that the call data may not necessarily be generated during the call and/or a particular call phase. Rather, the call data may include call data previously stored, etc. Additionally, or alternatively, a message to store, retrieve, erase, etc., the call data and/or the identifier are not protocol dependent. Further, when the call data does not include UUI, the call data may not be destined to an endpoint device.

The foregoing description of implementations provides illustration, but is not intended to be exhaustive or to limit the implementations to the precise form disclosed. In this regard, the concepts described herein may have broader application. For example, in any network environment there may be differences in the capabilities with respect to the handling of data between and/or among devices along a communication path. In instances when a portion of the data to be exchanged cannot be transmitted along the communication path, this data may be divided from the communication path and subsequently rejoined to the communication path.

Additionally, or alternatively, the implementations described herein may be modified. For example, the implementations described herein may not be limited to instances when call data cannot be forwarded along a call path. Rather, there may be other reasons for employing the call data server to store call data. For example, there may be instances when sensitive information (e.g., a social security number, an account number, personal information (e.g., medical information), financial information, etc.) may be associated with a call. In this regard, among other things, adequate security measures may be needed for the propagation of the sensitive information toward its destination in the call path. The addition of such security measures may, among other things, be costly, utilize additional resources, etc. Further, there may be issues at the application level for devices in the call path to account for such measures. As a result, it may be desirable to divert such information to the call data server. In this way, among other things, for example, sensitive information may be reach its destination with minimal cost, modification to devices in the call path, utilization of resources, etc.

In addition, while a series of blocks has been described with regard to the process illustrated in FIG. 9, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method, comprising:
   receiving a call;
   generating call data for the call subsequent to receiving the call;
   determining whether the call data can be forwarded along a call path;
   identifying whether the call shares a same automatic number identification (ANI) and a same dialed number identification service (DNIS) with another call in response to determining that the call data cannot be forwarded along the call path;
   generating an identifier in response to identifying that the call shares the same ANI and the same DNIS with the other call, wherein the generating comprises:
      selecting a new DNIS, from a DNIS pool of DNIS numbers, which is different from the same DNIS; and
      generating the identifier that includes the same ANI and the new DNIS;
   assigning to the call data the identifier that identifies the call data;
   forwarding the call along the call path without the call data; and
   storing the call data and the identifier at a device outside the call path.

2. The method of claim 1, wherein the call includes voice data, the voice data includes an automatic number identification (ANI) and a dialed number identification service (DNIS), and the method further comprising:
   retrieving the call data based on the identifier at a downstream device along the call path.

3. The method of claim 1, further comprising:
   identifying that the call does not share the same automatic number identification (ANI) and the same dialed number identification service (DNIS) with the other call.

4. The method of claim 3, further comprising:
   generating an identifier, that includes an automatic number identification (ANI) and a dialed number identification service (DNIS) associated with the call in response to identifying that the call does not share the same ANI and the same DNIS.

5. The method of claim 1, further comprising:
   selecting an attachment number from a pool of attachment numbers; and
   generating the identifier that includes the attachment number.

6. The method of claim 1, further comprising:
   receiving a request for the call data from a device of the call path; and
   providing the call data to the device of the call path.

7. The method of claim 1, further comprising:
   storing the call data and the identifier with a data state;
   determining whether other call data associated with another identifier is to be stored based on the data state associated with the call data and the identifier, wherein the other identifier is the same as the identifier; and
   storing or omitting to store the other call data with the other identifier based on a determination of the data state associated with the call data and the identifier.

8. The method of claim 1, further comprising:
   erasing the call data and the identifier from the device outside the call path when the call data and the identifier are not retrieved within a particular time interval.

9. The method of claim 1, further comprising:
   receiving an erase request; and
   erasing the call data and the identifier at the device outside the call path in response to receiving the erase request.

10. The method of claim 1, wherein the call data includes user-to-user information.

11. A system comprising:
    a first device comprising:
       a first communication interface;
       a first memory that stores instructions;
       a first processor to execute the instructions to:
          receive, via the first communication interface, a call;
          generate call data subsequent to receipt of the call;
          determine whether the call data associated with the call can be transmitted to another device;
          identify whether the call shares a same automatic number identification (ANI) and a same dialed number identification service (DNIS) with another call in response to a determination that the call data cannot be forwarded along the call path;
          generate an identifier in response to an identification that the call shares the same ANI and the same DNIS with the other call, wherein a generation of the identifier comprises:
             select a new DNIS, from a DNIS pool of DNIS numbers, which is different from the same DNIS; and
             generate the identifier that includes the same ANI and the new DNIS;
          assign the identifier that identifies the call data to the call data;
          transmit, via the first communication interface, to a call data device, the call data and the identifier the call data device comprising:
       a communication interface;
       a memory that stores instructions; and
       a processor to execute the instructions to:
          receive, via the communication interface, the call data and the identifier from the first device; and
          store the call data and the identifier.

12. The system of claim 11, wherein the processor to execute the instructions to:
    omit to store other call data associated with another call in response to a determination that an identifier that identifies the other call data is the same as the identifier associated with the call data.

13. The system of claim 11, wherein the call data is associated with a telephone call and the identifier is not unique, and wherein the processor to execute the instructions to:
store the call data and the identifier with a data state; and
alter the data state in response to receiving a request for the call data or alter the data state in response to not receiving a request for the call data within a particular period of time.

14. The system of claim 11, wherein the identifier is unique, and wherein the processor to execute the instructions to:
erase the call data and the identifier when the call data is not obtained by a second device within a particular period of time.

15. The system of claim 11, wherein the first processor to execute the instructions to:
identify that the call does not share the same automatic number identification (ANI) and the same dialed number identification service (DNIS) with the other call; and
generate an identifier that includes an automatic number identification (ANI) and a dialed number identification service (DNIS) associated with the call in response to an identification that the call does not share the same ANI and the same DNIS.

16. The system of claim 11, wherein the call data device is outside a call path.

17. The system of claim 11, wherein the call includes an automatic number identification (ANI) and a dialed number identification service (DNIS).

18. A method comprising:
receiving a call with call data;
determining whether the call data can be forwarded along a call path;
identifying whether the call shares a same automatic number identification (ANI) and a same dialed number identification service (DNIS) with another call in response to determining that the call data cannot be forwarded along the call path;
generating an identifier in response to identifying that the call shares the same ANI and the same DNIS with the other call, wherein the generating comprises:
selecting a new DNIS, from a DNIS pool of DNIS numbers, which is different from the same DNIS; and
generating the identifier that includes the same ANI and the new DNIS;
assigning to the call data the identifier that identifies the call data;
forwarding the call along the call path without the call data; and
storing the call data and the identifier at a device outside the call path.

19. The method of claim 18, further comprising:
storing multiple call data, identifiers, which identify the multiple call data, and data states of the multiple call data;
receiving the call data and the identifier; and
determining whether one of the identifiers is the same as the identifier.

20. The method of claim 19, further comprising:
determining a data state associated with one of the identifiers and one of the multiple call data in response to determining that the one of the identifiers is the same as the identifier; and
determining whether the call data and the identifier is to be stored based on the data state.

21. The method of claim 19, wherein the call data and the identifier of the call data is received as a part of a call setup signaling message, and wherein the data state includes one of stored, retrieved, or expired.

22. The method of claim 18, wherein the call data includes information related to Signaling System 7 (SS7) parameter information.

* * * * *